United States Patent

[11] 3,563,362

| [72] | Inventor | Giordano Tomelleri |
| | | Via Montorio 22, Verona, Italy |
| [21] | Appl. No. | 792,101 |
| [22] | Filed | Jan. 17, 1969 |
| [45] | Patented | Feb. 16, 1971 |
| [32] | Priority | Jan. 19, 1968 |
| [33] | | Italy |
| [31] | | 61204-A/68 |

[54] ALIGNING DEVICE FOR USE WITH MACHINES FOR PROCESSING FRUIT
7 Claims, 6 Drawing Figs.

[52] U.S. Cl. ............................................. 198/33
[51] Int. Cl. ........................................ B65g 47/24
[50] Field of Search ............................ 198/33R1, 192; 51/236

[56] References Cited
UNITED STATES PATENTS

| 1,426,910 | 8/1922 | Replogle | 51/236 |
| 3,166,184 | 1/1965 | Boyd | 198/192 |
| 3,225,892 | 12/1965 | Keesling | 198/33R1 |

Primary Examiner—Richard E. Aegerter
Attorney—Oberlin, Maky, Donnelly & Renner

ABSTRACT: This invention relates to a device which helps to mechanically align fruit of substantially round or oval shape and which is to be stoned and/or cored and/or cut into two or more sections in a fruit processing machine, the device comprising a spindle, at least one roller freely rotatably mounted on said spindle for supporting the fruit when it is rotated in a supporting cup of the machine.

Patented Feb. 16, 1971

3,563,362

ALIGNING DEVICE FOR USE WITH MACHINES FOR PROCESSING FRUIT

Devices are known in which the fruit is rotated in supporting cups so that the greatest measurement of the kernel stone or core of each fruit coincides with the vertical center of the cup. Such devices have not given very satisfactory results inasmuch as the fruit has to be aligned by hand after being mechanically rotated in order to avoid considerable losses in production due to inaccurately aligned fruit.

As is known, when the fruit is being mechanically rotated, it rests against the wall of the cup which is usually in the form of a recess, the curvature of which is greater than that of the fruit. The friction between the wall of the cup and the fruit can be very considerable, especially near the edge of the cup and is often greater than that which the rotating means exerts on the fruit. In such cases, the fruit becomes fixed in the cup and is thus not aligned in the requisite manner.

Attempts have been made to avoid this shortcoming and in particular, aligning means have been constructed which have knurled surfaces and which thus increase the friction between the rotating means and the fruit without, however, achieving the desired aim. The invention aims to avoid the aforementioned shortcoming by providing the fruit with an unstable support near the edge of the cup, which also has the advantage of keeping the fruit clear of these edges. The said unstable support besides considerably reducing the areas of friction between the fruit and the cup, turns a high percentage of sliding friction into rolling friction. Thus the friction between the fruit and the cup will always be less than that between the fruit and the rotating means, so that the fruit is in each case rotated by the aligning means until it has been brought into optimum alignment. When carrying out tests on a combined peach pitter and halver, the applicant was surprised to find that as a result of using the aligning means in accordance with the invention, the loss in production due to misalignment of the fruit was reduced to a negligible percentage.

According to the present invention there is provided an aligning device for use with machines for processing fruit of substantially round or oval shape, comprising a roller or series of rollers mounted so as to be freely rotatable about a spindle and which form an unstable support for the fruit when it is being rotated in a supporting cup of the machine.

Other features of the invention will become apparent in the course of the following description which should be considered in conjunction with the accompanying sheet of drawings which illustrate two preferred embodiments of the invention and are given as nonlimitative examples, and in which.

Figure 1:
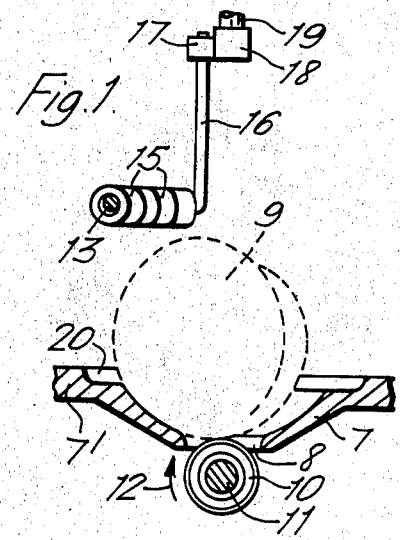
FIG. 1 is a vertical section through the center of a cup together with its aligning element, the fruit and the means according to the invention, taken along line 1-1 indicated on FIG. 4.

In the various FIGS. of the accompanying drawings like and equivalent parts bear similar reference numerals. The fruit 9, for example a peach, is placed in a cup 7 formed in a plate 7' and is positioned above an opening 8 provided in the base of the cup 7. The fruit 9 rests against an aligning wheel 10 which is provided on a shaft 11 and rotated for example, in the direction indicated by the arrow 12. The rotary motion of wheel 10 is transmitted to the fruit 9 until the fruit 9 has reached a position in which the depression formed in the region of the stalk lies above the wheel 10, as can be seen more clearly in FIG. 3.

When the fruit 9 has been rotated into the optimum alignment position it rests upon the lip which defines the opening 8 and will not be further rotated by the wheel 10 since the depression formed in the region of the stalk prevents any contact between the fruit 9 and the aligning wheel 10.

Figure 3:
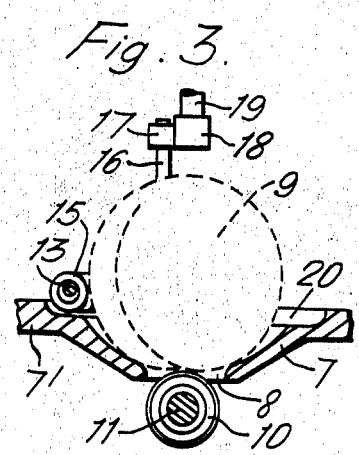
FIG. 3 is a section similar to those of FIGS. 1 and 2 in which the fruit has been brought into its optimum aligned position.

It is obvious that before reaching the position shown in FIG. 3, the fruit 9 will rotate bodily and be supported by the wall of the cup 7 as shown in the position illustrated in FIG. 1 or in a position diametrically opposed to that indicated in the said FIG. In this case, the fruit 9 bears more upon the wall of the cup 7 than on the wheel 10 and the sliding friction between the fruit 9 and the wall, which is very considerable near the edge of the cup 7, is greater than that between the wheel 10 and the fruit 9, so that the fruit 9 becomes fixed in the cup 7 and cannot be brought into optimum alignment.

The aligning means in accordance with the invention consists of a spindle 13, which is curved and may be arc-shaped or, for example, although not shown, completely circular and which carries rollers 15 formed of a plastics, rubber or similar material which are mounted on the spindle 13 so as to be freely rotatable about the axis of the spindle 13.

Figure 2:
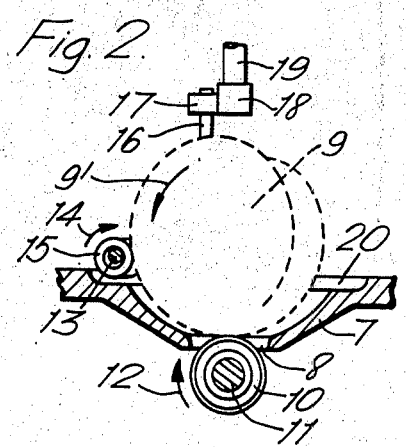
FIG. 2 is a section similar to that shown in FIG. 1 but with the aligning means in its operative position.
Figure 4:
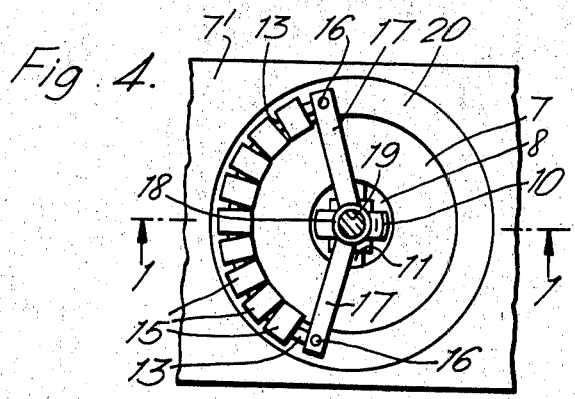
FIG. 4 is a plan view of the cup and its associated aligning means.

Two arms 16 support the spindle 13 and are secured by means of brackets 17 (see FIG. 4), a sleeve 18 and a tube 19, to a movable frame (not shown), which serves to lower the aligning means to the operative position as soon as the opening 8 of a cup 7 has been placed over the aligning wheel 10. When it has been lowered the rollers 15 of the aligning means are accommodated in a recess 20 provided at the upper edge of the cup 7. In this position, (see FIG. 2) the rollers 15 cause the fruit 9 to turn in the direction or arrow 9' due to the action of a roller 10 and since they are in contact with the fruit 9, they are in turn rotated in the direction indicated by arrow 14.

It is evident that the friction between the fruit 9 and the rollers 15 is of a rolling type and it is likewise clear that the rollers 15 provide the fruit 9 with a rotatable supporting surface which keeps it free of the edge of cup 7.

Thus, because of its own weight, the fruit 9 will always bear principally upon wheel 10 which sets the fruit turning and keeps it thus rotating until it has reached the position shown in FIG. 3, i.e. the position of optimum alignment.

Figure 5:
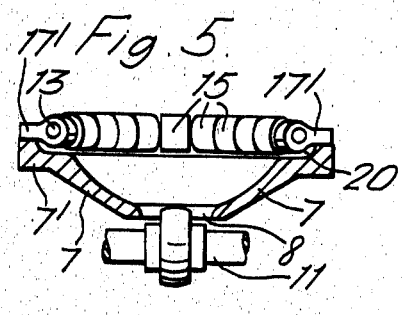
FIG. 5 is a vertical section through the center of a cup together with its aligning element, the fruit and the aligning means of a second embodiment of the invention, taken along line 5-5 indicated on FIG. 6.
Figure 6:
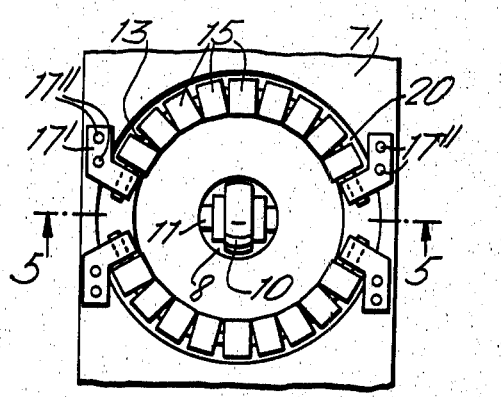
FIG. 6 is a plan view of the cup shown in FIG. 5.

In the embodiment shown in FIGS. 5 and 6, the spindle 13 of the support means instead of being secured to a movable frame, is connected by supports 17' and fastening means 17'' to the plate 7' in which the cup 7 is provided. This, however, in no way affects the efficiency and working of the aligning means as described above.

It is clear that given the above information, anyone versed in the art could easily modify the device in some other way in order to achieve the aim of the invention and thus some such modifications may be considered as lying within the scope of the appended claims.

Thus, for example, the rollers 15 may be mounted on spindles housed in a recess in the inner wall of the cup 7 in order to produce rolling friction of a type which will exclude all possibility of sliding friction between the fruit 9 and the aligning means. The fruit may comprise an apple, peach, apricot or similarly shaped fruit.

I claim:

1. Apparatus for processing fruit of substantially round or oval shape comprising a cup for supporting the fruit, means for rotating the fruit in said cup, and roller means positioned for rotation adjacent the periphery of said cup for providing a rotatable supporting surface for the fruit when rotated by said rotating means.

2. The apparatus of claim 1 further including a spindle located outside of said cup, said roller means being freely rotatably mounted on said spindle.

3. The combination of claim 2 wherein said spindle is curved about the vertical axis of the cup.

4. The apparatus of claim 2 further including a vertically movable frame, a spindle mounted on said frame, said roller means being freely rotatably mounted on said spindle, and means for effecting vertical movement of said frame to bring the rollers into contact with the fruit.

5. The apparatus of claim 1 wherein said cup is formed in a plate, spindle means mounted on said plate, said roller means being freely rotatably mounted on said spindle means.

6. The apparatus of claim 1 wherein a recess is formed in said cup around the lip thereof, said roller means being located at least partially in said recess during operation of said apparatus.

7. The apparatus of claim 1 further including a spindle located outside said cup, said roller means comprising a plurality of rollers freely rotatably mounted on said spindle, the outer surface of said rollers generating a cylinder curved toward the interior of said cup.